J. BROWN.
FEED BAG SUPPORT.
APPLICATION FILED JUNE 15, 1910.
992,107.
Patented May 9, 1911.
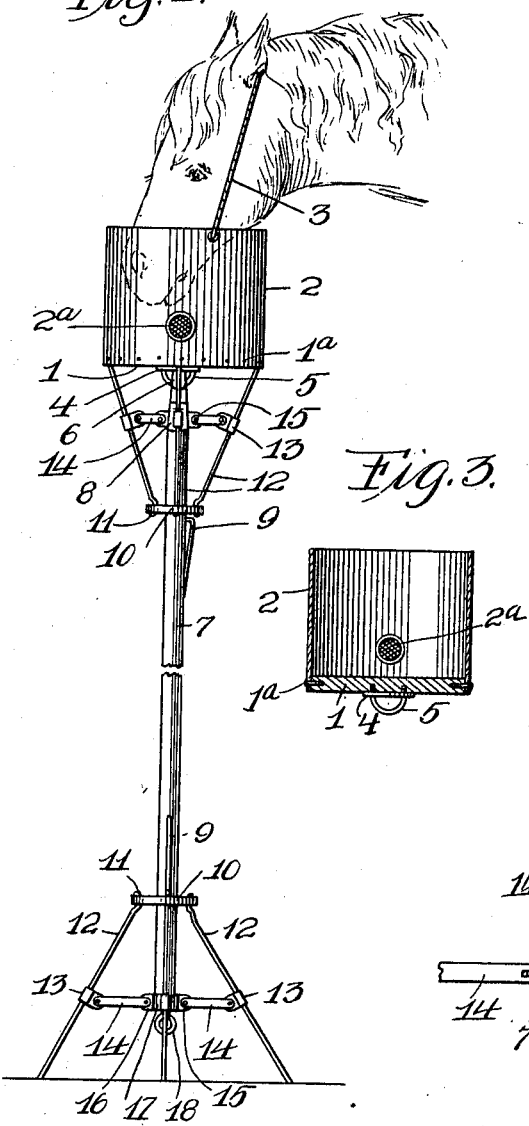

UNITED STATES PATENT OFFICE.

JOHN BROWN, OF PITTSBURG, PENNSYLVANIA.

FEED-BAG SUPPORT.

992,107. Specification of Letters Patent. Patented May 9, 1911.

Application filed June 15, 1910. Serial No. 566,958.

*To all whom it may concern:*

Be it known that I, JOHN BROWN, a citizen of the United States of America, residing at N. S. Pittsburg, in the county of Allegheny and State of Pennsylvania, have invented certain new and useful Improvements in Feed-Bag Supports, of which the following is a specification, reference being had therein to the accompanying drawing.

This invention relates to feed bag supports, and the invention has for its object, first, to provide novel means for obviating the necessity of a horse placing a feed bag upon the ground in order to reach the bottom of the feed bag, thereby preventing the feed bag from being worn and torn by contacting with the ground; second, to afford simple and effective means for supporting a feed bag whereby a horse can easily reach the bottom of the same and obtain the entire contents of the feed bag; third, to prevent the waste of feed, and fourth, to provide a simple, inexpensive, and collapsible support that can be attached to the present type of feed bag for supporting the same in approximately a horizontal position, thus permitting of free movement of the horse's head while eating. These and such other objects as may hereinafter appear are attained by a feed bag support that is constructed upon the principle of an umbrella stick and frame whereby the support can be collapsed to occupy a comparatively small space when the feed bag is not in use.

Reference will now be had to the drawing forming a part of this specification, in which:

Figure 1 is a side elevation of the feed bag and support as connected to a horse's head. Fig. 2 is a side elevation of the feed bag support collapsed and partly broken away. Fig. 3 is a vertical sectional view of the feed bag. Fig. 4 is an enlarged elevation of one of the stays or supports and spreader thereof, and Fig. 5 is a horizontal sectional view of a portion of the feed bag support.

In the accompanying drawings the reference numeral 1 denotes a circular plate to which is attached, by nails or other fastening means 1ª, a flexible casing 2, preferably made of canvas or other durable fabric. The casing 2 is provided with ventilating openings or vents 2ª and in conjunction with the plate 1 constitutes the ordinary and well-known type of feed bag at present used for feeding horses without unhitching or placing the same in the stable, the bag being suspended or detachably connected to the horse's head by a rope or strap 3.

Suitably attached to the bottom of the plate 1 is a cross bar 4 having a depending staple 5 centrally of its ends. Connected to the staple 5 is a snap hook 6, carried by the upper end of a stick or post 7, said stick or post being made of a length to conveniently support the plate 1 at the proper elevation, whereby a horse can feed from the bag, as will hereinafter appear.

The stick or post 7 is recessed, adjacent to the ends thereof for spring catches 9, and adapted to engage said catches are runners 10 slidably mounted upon the stick or post 7. Pivotally connected to the runners 10, as at 11, are a plurality of angularly disposed equally-spaced stays or supports 12, and these supports intermediate the ends thereof are pivotally connected, as at 13, to spreaders 14 pivotally connected, as at 15, to lugs 16 peripherally arranged around the ferrule 8 of the snap hook 6 and a sleeve 17 mounted upon the lower end of the stick or post 7.

With the runners 10 supported by the catches 9, the stays or supports 12 will be retained in an extended position to firmly support the plate 1 in a horizontal position, and also to support the stick or post 7 in a vertical position, and with the runners 10 moved toward each other upon the stick, the stays or supports will be retained in a retracted position in proximity to the stick 7, allowing the plate 1 to be easily removed. The lower end of the stick or post 7 is provided with a screw-eye or eyelet 18, and when the feed bag support is collapsed it can be suspended by the screw-eye 18 from a suitable hook or support or it will occupy a comparatively small space in a box. When in a set-up or extended position, it serves practically the same purpose as a stationary feed box. The stick 7 is preferably made of wood similar to the plate 1, while the remainder of the support is made of light and durable metal.

What I claim, is:

The combination with a flexible feed bag having a rigid bottom, and a transversely extending bar secured to the base of said bottom and having a staple depending therefrom substantially midway of its ends, of a supporting stick, a snap hook fixed on the upper end of said stick and provided with peripherally arranged lugs, a runner on the supporting stick, stays pivotally connected at their lower ends to said runner and at their upper ends adapted to engage the bottom of said feed bag, spreaders pivotally connected at their ends to said stays and to the lugs of said snap hook respectively, a sleeve fixed on the lower end of said stick and provided with peripherally arranged lugs, a second runner on the supporting stick, stays pivotally connected at their upper ends to said runner and at their lower ends adapted to engage the ground, spreaders pivotally connected at their ends to said stays and to the lugs of said sleeve respectively, and spring catches carried by the supporting stick for holding the stays at the upper and lower ends of said stick in extended position when the snap hook is in engagement with said staple.

In testimony whereof I affix my signature in the presence of two witnesses.

JOHN BROWN.

Witnesses:
SOL MILLER,
L. B. McCONAGHEY.